United States Patent
Pelliconi et al.

(10) Patent No.: US 6,395,832 B1
(45) Date of Patent: May 28, 2002

(54) POLYOLEFIN COMPOSITION HAVING A HIGH BALANCE OF STIFFNESS AND IMPACT STRENGTH

(75) Inventors: Anteo Pelliconi, Rovigo; Giovanni Galetti, Forlì; Paolo Ferrari, Ferrara, all of (IT)

(73) Assignee: Baselltech USA Inc., Wilmington, DE (US)

(*) Notice: Subject to any disclaimer, the term of this patent is extended or adjusted under 35 U.S.C. 154(b) by 0 days.

(21) Appl. No.: 09/582,599

(22) PCT Filed: Oct. 20, 1999

(86) PCT No.: PCT/EP99/07953

§ 371 (c)(1),
(2), (4) Date: Jun. 28, 2000

(87) PCT Pub. No.: WO00/26295

PCT Pub. Date: May 11, 2000

(30) Foreign Application Priority Data

Nov. 3, 1998 (EP) .............................................. 98203698

(51) Int. Cl.$^7$ ............................ C08L 23/10; C08L 23/16
(52) U.S. Cl. ......................... 525/191; 525/240; 524/847
(58) Field of Search ................................... 525/191, 240; 524/847

(56) References Cited

FOREIGN PATENT DOCUMENTS

| EP | 0593221 | 4/1994 |
|----|---------|--------|
| EP | 0601559 | 6/1994 |
| JP | 09071713 | 3/1997 |

*Primary Examiner*—Nathan M. Nutter

(57) ABSTRACT

A polyolefin composition comprising (percentage by weight): (A) from 40 to 60% of a broad molecular weight distribution propylene polymer (component A) having a polydispersity index from 5 to 15 and melt flow rate of from 80 to 200 g/10 min (according to ASTM-D 1238, condition L); and (B) from 40 to 60% of a partially xylene-insoluble olefin polymer rubber (component B) containing at least 65% by weight of ethylene; the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, both values on intrinsic viscosity being measured in tetrahydronaphthalene at 135° C. Said composition finds application in automotive field.

9 Claims, No Drawings

POLYOLEFIN COMPOSITION HAVING A HIGH BALANCE OF STIFFNESS AND IMPACT STRENGTH

The present invention relates to an elastomeric thermoplastic polyolefin composition. In particular, the present invention relates to compositions containing a broad molecular weight distribution propylene polymer.

Due to its mechanical and physical properties, the polymer composition of the present invention finds application above all in automotive field (e.g. bumpers and side strips).

Such a polyolefin composition has a good balance of mechanical properties, in particular improved balance of flexural modulus and IZOD impact strength even at low temperatures (e.g. at −30° C.).

In addition to the above properties the composition of the present invention is endowed with satisfactory optical properties. As required by the market, the composition shows low gloss values.

An added advantage, which is shown by the composition of the present invention, is that it presents a low value of coefficient of linear thermal expansion (CLTE). Said property imparts a higher dimensional stability to the articles produced with the polyolefin composition of the present invention.

Therefore an object of the present invention is a polyolefin composition comprising (percentage by weight):

(A) from 40 to 60%, preferably 40 to 55%, of a broad molecular weight distribution propylene polymer (component A) having a polydispersity index from 5 to 15 and melt flow rate of from 80 to 200 g/10 min (according to ASTM-D 1238, condition L); and (B) from 40 to 60%, preferably 45 to 60%, of a partially xylene-soluble olefin polymer rubber (component B) containing at least 65% by weight of ethylene;

the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, preferably from 2.1 to 2.4, both values of intrinsic viscosity being measured in tetrahydronaphthalene at 135° C.

The method for measuring the xylene-soluble content and polydispersity index are described hereinbelow. The room temperature means a temperature of about 25° C. in the present application.

The polyolefin composition of the present invention may further contain a mineral filler. When present, it is contained in an amount from about 0.5 to 3 parts by weight with respect to the sum of components (A) and (B).

The composition of the present invention typically has a melt flow rate of from 5 to 20 g/10 min. In addition, typically, it has a flexural modulus of from 650 to 1000 MPa, preferably from 700 to 1000 MPa. Preferably the coefficient of linear thermal expansion is up to 8° $C.^{-1} \times 10^{-5}$, more preferably from 5 to 8; notched IZOD resilience at −30° C. is typically of 15 KJ/m² or higher, preferably from 18 KJ/m². Typically, gloss values are lower than 50‰. The methods for measuring the said properties are described hereinbelow.

Component (A) is a crystalline propylene homopolymer or a propylene copolymer with ethylene or $C_4$–$C_{10}$ α-olefin or a mixture thereof. Ethylene is the preferred comonomer. The comonomer content ranges preferably from 0.5 to 1.5% by weight, more preferably from 0.5 to 1% by weight.

A xylene-insoluble content at 25° C. of component (A) is typically greater than 90%, preferably equal to or greater than 94%.

Preferably, component (A) has a melt flow rate of from 80 to 150 g/10 min.

Component (A) approximately has a molecular weight distribution $\overline{M}_w/\overline{M}_n$, ($\overline{M}_w$=weight average molecular weight and $\overline{M}_n$=number average molecular weight, both measured by gel permeation chromatography) of from 8 to 30, more preferable from 8.5 to 25.

The olefin polymer rubber of component (B) used in the polyolefin composition of the present invention can be a poly(ethylene-co-$C_3$–$C_{10}$ α-olefin) or poly(ethylene-co-propylene-co-$C_4$–$C_{10}$ α-olefin) having an ethylene content preferably from 65 to 80% by weight. The latter contains about from 0.5 to 10% by weight of a $C_4$–$C_{10}$ α-olefin. The olefin polymer rubber can optionally further contain a diene, the content of which is preferably of from 1 to 10% by weight, more preferably from 1 to 5% by weight.

The olefin polymer rubber of component (B) is partially soluble in xylene at room temperature. The xylene-insoluble content is about 25–35% by weight, preferably 27–33% by weight.

The $C_3$–$C_{10}$ α-olefins useful in the preparation of component (B) described above include propylene, 1-butene, 1-pentene, 1-hexene, 4-methyl-1-pentene and 1-octene. Propylene and 1-butene are particularly preferred.

The mineral filler, when present, is preferably selected from talc, calcium carbonate, silica, conventional clays, wollastonite, diatomaceous earth, titanium oxide and zeolites. Preferably, the mineral filler is talc.

In addition to the mineral fillers discussed above, the polyolefin composition of the present invention may further contain conventional additives, for example, stabilizers, pigments, other fillers and reinforcing agents, e.g. carbon black and glass beads and fibers.

The polyolefin composition of the present invention can be prepared by way of a physical blend or chemical blend.

Preferably, the composition of the present invention is prepared directly in polymerization by sequential polymerization processes in a series of reactors based on the use of particular stereospecifc Ziegler-Natta catalysts, producing by polymerization a mixture of component (A) and component (B). Subsequently, the mineral filler is, optionally, added by blending, or in the final pelletization section of the industrial polymerisation plant.

The polymerization process is carried out in at least three consecutive stages, in the presence of particular stereopecific Ziegler-Natta catalysts, supported on a magnesium halide in active form. In particular, the broad molecular weight distribution propylene polymer of component (A) described above can be prepared by sequential polymerization in at least two stages and the olefin polymer rubber in the other stage(s).

Alternatively, the polyolefin composition of the present invention can be physically blended or admixed in any conventional mixing apparatus, such as an extruder or a Banbury mixer, by mixing components (A) and (B) and optionally further components. Components (B) and (A) are blended in the molten or softened state.

As previously mentioned, the polymerization stage can be carried out in at least three sequential steps, wherein components (A) and (B) are prepared in separate subsequent steps, operating in each step in the presence of the polymer formed and the catalyst used in the immediately preceding step. The catalyst is added only in the first step, however its activity is such that it is still active for all the subsequent steps. The order in which components (A) and (B) are prepared is not critical. However, it is preferred to produce component (B) after producing component (A).

The catalyst used for preparing component (A) is preferably characterized in that it is capable of producing propylene polymers having a xylene insoluble fraction at 25° C. greater than or equal to 90% by weight, preferably greater than or equal to 94%. Moreover, it has a sensitivity to molecular weight regulators high enough to produce propylene homopolymers having a melt flow rate in the range from 1 to 20 g/10 min and greater than 200 g/10 min.

Methods of preparing the broad molecular weight distribution propylene polymer of component (A) of the present invention are described in the European patent application 573 862.

The above said catalyst is used in all the steps of the polymerization process of the present invention for producing directly the sum of components (A) and (B).

Catalysts having the above mentioned characteristics are well known in the patent literature; particularly advantageous are the catalysts described in U.S. Pat. No. 4,399,054 and European patents 45977 and 395083.

The polymerization process can be carried out in continuous or in batch, according to known techniques and operating in liquid phase, in the presence or absence of inert diluent, or in gas phase or in mixed liquid-gas phases. It is preferable to operate in gas phase.

Reaction time and temperature are not critical; however, the temperature typically ranges from 20 to 100° C.

Preferably, the reaction temperature is generally from 40 to 65° C. for the polymerization of component (B).

Regulation of the molecular weight is carried out by using known regulators such as hydrogen.

An essential component of the Ziegler-Natta catalysts used in the polymerization process of the present invention is a solid catalyst component comprising a titanium compound having at least one titanium-halogen bond, and an electron-donor compound, both supported on a magnesium halide in active form.

Another essential component (co-catalyst) is an organoaluminum compound, such as an aluminum alkyl compound. An external donor is optionally added.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of formula:

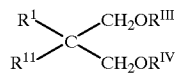

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said diethers are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis(methoxymethyl) fluorene.

The preparation of the above mentioned catalyst components is carried out according to various methods. For example, a $MgCl_2 \cdot nROH$ adduct (in particular in the form of spherical particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates and in particular silicon compounds containing at least one Si—OR bond, where R is a hydrocarbon radical. Useful examples of silicon compounds are (tert-butyl)$_2$ Si (OCH$_3$)$_2$, (cyclohexyl) (methyl) Si (OCH$_3$)$_2$, (phenyl)$_2$ Si (OCH$_3$)$_2$ and (cyclopentyl)$_2$ Si (OCH$_3$)$_2$.

1,3-diethers having the formulae described above can also be used advantageously.

If the internal donor is one of these diethers, the external donors can be omitted.

The catalysts can be precontacted with small quantities of olefins (prepolymerization), thus improving both the performance of the catalysts and the morphology of the polymers. Prepolymerization is carried out maintaining the catalysts in suspension in a hydrocarbon solvent (hexane or heptane, for example) and polymerizing at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component.

As mentioned above, the polyolefin composition of the present invention can also be obtained by blending. The blending is done using known techniques starting from pellets or powders or particles of the polymers obtained from the polymerization process, which are preferably premixed with the mineral filler in the solid state (with a Banbury, Henshel or Lodige mixer, for example) and then extruded.

As above-mentioned, the polymer composition of the present invention is suitable to prepare bumpers and other parts of vehicles, such as side strips. Hence, the polymer composition is subjected to the conventional techniques used to prepare the said articles.

The following analytical methods are used to characterize the propylene polymer of component (A), rubber copolymer of component (B) and the composition obtained therefrom.
Melt Flow Rate: determined according to ASTM-D 1238, condition L.
[η] intrinsic viscosity: determined in tetrahydronaphtalene at 135° C.
Ethylene: determined according to I.R. Spectroscopy.
Soluble and insoluble in xylene: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble in xylene at ambient temperature (25° C.).
Polydispersity Index (P.I.): measurement of the molecular weight distribution in the polymer. To determine the P.I. value, the modulus separation at low modulus value, e.g., 500 Pa, is determined at a temperature of 200° C. by using a RMS-800 parallel-plates rheometer model marketed by Rheometrics (USA), operating at an oscillation frequency which increases from 0.01 rad/second to 100 rad/second. From the modulus separation value, the P.I. value can be derived using the following equation:

$$P.I.=54.6(\text{modulus separation})^{-1.76}$$

wherein the modulus separation (MS) is defined as:

$$MS=(\text{frequency at } G'=500 \text{ Pa})/(\text{frequency at } G''=500 \text{ Pa})$$

wherein G' is the storage modulus and G" is the low modulus.
Flexural Modulus: determined according to ASTM-D 790.
CLTE: this test method is based on ASTM methods D 696 and E831-86. Before the CLTE measurement the sample is conditioned into the TMA (thermomechanical analysis) apparatus at 120° C. for 10 minutes in order to erase the stresses induced into the specimen (3.5 mm thick and 10 mm length) by injection moulding. After that the dilatation curve is measured in the temperature range from 0 to 130° C. at 3° C./min scanning rate under the probe, the load of which is 1 mN (flat probe 3.66 mm diameter).
The CLTE measurement is carried out in longitudinal way with respect to the line of injection of the polymer.
CLTE is determined as alpha=$\Delta L/(L°\times\Delta T)$ in the temperature range 23–80° C.
$\Delta L$: length variation in the temperature range from 23 to 80° C.
$\Delta T$: 80–23=57° C.
$L°$: initial specimen length.
Notched IZOD impact test at −30° C.: determined according to ASTM-D 256/A.
Gloss: determined according to ASTM-D 2457

The following examples are given in order to illustrate and not limit the present invention.

EXAMPLES 1–2 AND COMPARATIVE EXAMPLES 1C–2C

Preparation of the solid catalyst component

The $MgCl_2$/alcohol adducts in spherical form are prepared following the method described in example 2 of U.S. Pat. No. 2,399,054 but operating at 3,000 RPM instead of 10,000 RPM.

The adduct is partially dealcoholated by heating at increasing temperatures from 30 to 180° C. operating in nitrogen current.

In a 1 liter flask equipped with a condenser and mechanical agitator is introduced, under a nitrogen current, 625 ml of $TiCl_4$. At 0° C. while agitating are added 25 g of partially dealcoholated adduct. It is then heated up to 100° C. in 1 hour; when the temperature reaches 40° C. diisobutylphthalate (DIBF) is added in molar ratio Mg/DIBF=8.

The temperature is maintained at 100° C. for 2 hours. It is then left to decant and afterwards the hot liquid is siphoned off. 550 ml of $TiCl_4$ is added and it is heated to 120° C. for 1 hour. Finally, it is left to settle and the liquid is siphoned off while hot; the residual solid is washed 6 times with 200 ml aliquot of anhydrous hexane at 60° C. and 3 times at room temperature. The solid is then dried under vacuum.

Polymerization

The polymerization is carried out in continuous in a series of reactors equipped with devices to transfer the product from one reactor to the one immediately next to it.

In the gas phase, hydrogen propane and monomers are continuously analyzed and fed in order to maintain constant the desired concentrations.

In the polymerization run a mixture of a triethylaluminum (TEAL) activator and dicyclopentyldimethoxysilane (DCPMS) as electron-donor component is contacted with the solid catalyst component, in such a way that the TEAL/Cat weight ratio is 5, in a reactor at 30° C. for about 9 minutes. The TEAL and electron-donor compound are in such quantities that TEAL/DCPMS weight ratio is 15.

The catalyst is then transferred to a reactor containing an excess of liquid propylene and prepolymerized for 33 minutes at 25° C.

The prepolymer is then transferred to the first reactor in gas phase where the homopolymerization of the propylene occurs to obtain propylene homopolymers with low MFR. The product thus obtained is then transferred into the second reactor, where propylene is homopolymerized to obtain homopolymers with high MFR. Finally, the product of the second reactor is transferred to the third reactor, where ethylene is copolymerized with propylene to obtain component (B).

The polymerization conditions used in each reactor are shown in Table I and the properties of the products thus obtained are shown in Table II.

TABLE I

| EXAMPLE | 1 | 2 | 1C | 2C |
|---|---|---|---|---|
| 1° REACTOR | | | | |
| Temperature (° C.) | 80 | 80 | 70 | 70 |
| Polypropylene (wt %) | 20 | 19 | 24 | 25 |
| MFR L g/10 min | 2.7 | 2.5 | 6.9 | 10.7 |
| 2° REACTOR | | | | |
| Temperature (° C.) | 80 | 80 | 70 | 70 |
| Polypropylene (wt %) | 34 | 35 | 35 | 36 |
| MFR L (g/10 min) | 102 | 105 | 46 | 68 |
| Xylene insoluble (wt %) | 96.5 | 96.5 | 96.4 | 96.3 |
| $IV_A$ (dl/g) | 1.00 | 1.00 | 1.20 | 1.08 |
| P.I. | 12 | 12 | 6.0 | 6.2 |
| $\overline{M}_w\overline{M}_n$ | 19.99 | 19.99 | — | — |
| 3° REACTOR | | | | |

TABLE I-continued

| EXAMPLE | 1 | 2 | 1C | 2C |
|---|---|---|---|---|
| Temperature (° C.) | 65 | 65 | 65 | 65 |
| Poly(ethylene-co-propylene) (wt %) | 46 | 46 | 41 | 39 |
| C2/(C2 + C3) mol | 0.58 | 0.56 | 0.61 | 0.59 |

TABLE II

| EXAMPLE | 1 | 2 | 1C | 2C |
|---|---|---|---|---|
| MFR L (g/10 min) | 11.3 | 9.7 | 11.3 | 14.3 |
| Xylene soluble (wt %) | 31.6 | 32.1 | 29.2 | 26.8 |
| Xylene insoluble (wt %) | 66.7 | 66.2 | 69.1 | 72.0 |
| Ethylene content (wt %) | 33.2 | 34.6 | 29.7 | 28.5 |
| $IV_S$ (dl/g) | 2.23 | 2.26 | 2.40 | 2.39 |
| $IV_S/IV_A$ ratio | 2.23 | 2.26 | 2.0 | 2.21 |
| Flexural modulus (MPa) | 910 | 810 | 920 | 980 |
| IZOD resilience at −30° C. (KJ/m$^2$) | 33.1 | 19.9 | 9.2 | 11.2 |
| Gloss at 60° C. on 1 mm plaque (‰) | 39.9 | 41.0 | 67.4 | 38.0 |
| Longitudinal CLTE (° C.$^{-1}$ × 10$^{-5}$) | 7.18 | 7.29 | 7.05 | 10.63 |

What is claimed is:

1. A polyolefin composition comprising (percentage by weight):
   (A) from 40 to 60% of a broad molecular weight distribution propylene polymer (component A) having a polydispersity index from 5 to 15 and melt flow rate of from 80 to 200 g/10 min (according to ASTM-D 1238, condition L); and
   (B) from 40 to 60% of a partially xylene-insoluble olefin polymer rubber (component B) containing at least 65% by weight of ethylene;
   the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, both values on intrinsic viscosity being measured in tetrahydronaphthalene at 135° C.

2. The polyolefin composition of claim 1 further containing from 0.5 to 3 parts by weight with respect to the sum of components (A) and (B) of mineral fillers.

3. The polyolefin composition of claim 2 having a melt flow rate of from 5 to 20 g/10 min.

4. The polyolefin composition of claim 2 wherein component (A) has a melt flow rate of from 80 to 150 g/10 min.

5. The polyolefin composition of claim 2 wherein component (B) is a poly(ethylene-co-propylene).

6. A process for preparing a polyolefin composition, the polyolefin composition comprising (percentage by weight):
   (A) from 40 to 60% of a broad molecular weight distribution propylene polymer (component A) having a polydispersity index from 5 to 15 and melt flow rate of from 80 to 200 g/10 min (according to ASTM-D 1238, condition L); and
   from 40 to 60% by weight of ethylene;
   the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, both values on intrinsic viscosity being measured in tetrahydronaphthalene at 135° C.;
   wherein the monomers are polymerized in the presence of sterospecific catalysts supported on active magnesium halide in active form in at least three sequential steps, and wherein components (A) and (B) are prepared in separate subsequent steps, operating in each step in the presence of the polymer formed and the catalyst used in the immediately preceding step.

7. An article produced from a polyolefin composition comprising (percentage by weight):
   (A) from 40 to 60% of a broad molecular weight distribution propylene polymer (component A) having a polydispersity index from 5 to 15 and melt flow rate of from 80 to 200 g/10 min (according to ASTM-D 1238, condition L); and
   (B) from 40 to 60% of a partially xylene-insoluble olefin polymer rubber (component B) containing at least 65% by weight of ethylene; the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, both values on intrinsic viscosity being measured in tetrahydronaphthalene at 135° C.

8. A bumper produced from a polyolefin composition comprising (percentage by weight):
   (A) from 40 to 60% of a broad molecular weight distribution propylene polymer (component A) having a polydispersity index from 5 to 15 and melt flow rate of from 80 to 200 g/10 min (according to ASTM-D 1238, condition L); and
   (B) from 40 to 60% of a partially xylene-insoluble olefin polymer rubber (component B) containing at least 65% by weight of ethylene;
   the $IV_S/IV_A$ ratio between the intrinsic viscosity ($IV_S$) of the portion soluble in xylene of the polyolefin composition at room temperature and the intrinsic viscosity ($IV_A$) of component (A) ranging from 2 to 2.5, both values on intrinsic viscosity being measured in tetrahydronaphthalene at 135° C.

9. The polyolefin composition of claim 1 wherein the wherein the $IV_S/IV_A$ ratio between the intrinsic viscosity ($IV_S$) of the portion soluble in xylene of the polyolefin composition at room temperature and the intrinsic viscosity ($IV_A$) of component (A) ranges from 2.1 to 2.4.

* * * * *